(12) United States Patent
Prakash et al.

(10) Patent No.: US 11,067,968 B2
(45) Date of Patent: Jul. 20, 2021

(54) IIOT (INDUSTRIAL INTERNET OF THINGS) COMMUNICATIONS INTERFACE

(71) Applicant: Honeywell International Inc., Morris Plains, NJ (US)

(72) Inventors: Suraj Prakash, Bangalore (IN); Amol Kinage, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 76 days.

(21) Appl. No.: 15/995,079

(22) Filed: May 31, 2018

(65) Prior Publication Data
US 2019/0137980 A1    May 9, 2019

Related U.S. Application Data

(60) Provisional application No. 62/581,354, filed on Nov. 3, 2017.

(51) Int. Cl.
*G05B 19/418* (2006.01)
*H04L 29/08* (2006.01)
*H04L 12/24* (2006.01)

(52) U.S. Cl.
CPC ... *G05B 19/41845* (2013.01); *G05B 19/4185* (2013.01); *H04L 41/085* (2013.01);
(Continued)

(58) Field of Classification Search
CPC .......... G05B 19/41845; G05B 19/4185; H04L 67/12; H04L 41/085; H04L 67/34; H04L 41/0806; Y02P 90/02
See application file for complete search history.

(56) References Cited

U.S. PATENT DOCUMENTS 9,177,139 B2    11/2015   Hull Roskos
9,510,195 B2    11/2016   Perier
(Continued)

FOREIGN PATENT DOCUMENTS

WO    WO-2017196821 A1 * 11/2017    ......... G05B 19/0425

OTHER PUBLICATIONS

Jerker Delsing, "Building Automation Systems from Internet of Things", EISLAB.

(Continued)

*Primary Examiner* — Javier O Guzman
(74) *Attorney, Agent, or Firm* — Ortiz & Lopez, PLLC; Kermit D. Lopez; Luis M. Ortiz (57) ABSTRACT

Communications interface systems and methods for industrial process and manufacturing control. A first infrastructure supports a group of downloadable server protocol applications and a group of downloadable client protocol applications. A second infrastructure supports a group of pluggable hardware interfaces that connect with an underlying communications network. Additionally, a common infrastructure can be configured, which includes a manager and data aggregation layer that connects to and communicates with the group of downloadable server protocol applications and the group of downloadable client protocol applications. The common infrastructure manages and aggregates data between the first infrastructure and the second infrastructure and creates new interface features by plugging in new and/or available components in multiple form factors.

17 Claims, 4 Drawing Sheets

(52) U.S. Cl.
CPC .............. *H04L 67/12* (2013.01); *H04L 67/34* (2013.01); *H04L 41/0806* (2013.01)

(56) References Cited

U.S. PATENT DOCUMENTS

| | | | |
|---|---|---|---|
| 9,674,146 B2 | 6/2017 | Batke et al. | |
| 9,716,595 B1 | 7/2017 | Kravitz et al. | |
| 9,723,060 B2 | 8/2017 | Almadi et al. | |
| 9,740,896 B1 | 8/2017 | Ben-Bassat et al. | |
| 9,772,610 B2 | 8/2017 | Slessman | |
| 9,753,834 B1 | 9/2017 | Tang et al. | |
| 9,755,458 B2 | 9/2017 | Frampton | |
| 9,763,029 B2 | 9/2017 | Mirza et al. | |
| 9,768,613 B2 | 9/2017 | Taft | |
| 9,779,229 B2 | 10/2017 | Rooyakkers et al. | |
| 10,509,396 B2* | 12/2019 | Sandler | G06Q 10/00 |
| 10,735,220 B2* | 8/2020 | Cook | H04L 67/12 |
| 2013/0041997 A1 | 2/2013 | Li et al. | |
| 2015/0019553 A1* | 1/2015 | Shaashua | G06N 7/005 707/737 |
| 2017/0192414 A1* | 7/2017 | Mukkamala | G06F 3/04883 |
| 2017/0195424 A1 | 7/2017 | Nasir et al. | |
| 2017/0222999 A1 | 8/2017 | Banga et al. | |
| 2017/0230832 A1 | 8/2017 | Ophir et al. | |
| 2017/0237763 A1 | 8/2017 | Candelore | |
| 2017/0279620 A1 | 9/2017 | Kravitz et al. | |
| 2017/0279631 A1 | 9/2017 | Britt et al. | |
| 2017/0288447 A1 | 10/2017 | Guibene et al. | |
| 2017/0289176 A1 | 10/2017 | Chen et al. | |
| 2018/0217570 A1* | 8/2018 | Shah | G05B 19/042 |
| 2018/0330317 A1* | 11/2018 | Sepulveda | G06F 16/23 |
| 2019/0253339 A1* | 8/2019 | Mehmedagic | H04L 45/121 |
| 2020/0059908 A1* | 2/2020 | Joseph | H04W 24/08 |
| 2020/0301685 A1* | 9/2020 | Verma | G06F 9/455 |

OTHER PUBLICATIONS

Mike Fahrion, "Evolving from SCADA to IoT".
Ben Blanchette, "Industrial Internet of Things, Enabling Digital Transformation", Jun. 21, 2016, Honeywell Users Group.
"Industrial Internet of Things (IIoT) Research", Apr. 2016, GENPACT Research Institute.
Peter C. Evans and Marco Annunziata, "Industrial Internet: Pushing the Boundaries of Minds and Machines", Nov. 26, 2012.
"The Industrial Internet of Things", McRock Capital.
Siby Abraham, "The Internet of Things and the Industrial Internet: What's the difference?", Winsights vol. XXI.
"Trends in Factory Automation: The Internet of Things", Copyright 2015 Axiomtek Co., Ltd.

* cited by examiner

IIOT (INDUSTRIAL INTERNET OF THINGS) COMMUNICATIONS INTERFACE

CROSS-REFERENCE TO PROVISIONAL PATENT APPLICATION

This patent application claims priority under 35 U.S.C. 119(e) to U.S. Provisional Patent Application Ser. No. 62/581,354 entitled "IIOT (Industrial Internet of Things) Communications Interface," which was filed on Nov. 3, 2017, the disclosure of which is incorporated herein by reference in its entirety.

TECHNICAL FIELD

Embodiments are related to the field of industrial control and safety systems for hazardous plants and environments. Embodiments further relate to IIOT (Industrial Internet of Things) communications interfaces, modules, and devices. Embodiments also relate to pluggable hardware interfaces and downloadable applications that facilitate the connection of devices utilized in industrial control and manufacturing control systems and processes.

BACKGROUND

An industrial control system or safety system is an automated control system in which process controllers and equipment are distributed throughout a manufacturing plant and the communication between them involves the use of both proprietary and open protocols. Proprietary protocols are used within the systems belonging to a particular product line while open protocols are governed by standards organization and are used across products (e.g., MODBUS, EtherNet/IP, PROFINET, etc.). With many different communication protocols, both proprietary and those based on open standards, and also the evolution of technology changing the communication media over the years, there is a need to allow connectivity across devices communicating using different protocols and media.

Additionally, with the advent of the IIOT (Industrial Internet of Things) era, there is a need to allow easy integration with newer standards and protocols such as MQTT, COAP, OPCUA, etc. This calls for the creation of methods and systems that can integrate different protocols into the control and safety systems and which allow for the use of different devices across many different products belonging to the same or different vendor. In addition, it is desirable to offer a common configuration and usage experience while using different devices communicating via different communications protocols. Conventional approaches, however, lack a common configuration/usage experience across different IO and across different products, and further lack the ability to directly interface with IO from HMI/SCADA for non-critical parameters. In addition, conventional approaches are plagued by a low and inconsistent ability to serve data using open protocols such as EtherNet/IP, PROFINET, etc., and suffer from various development cycles and release alignment dependencies across product lines. Conventional approaches also have difficulties in adopting IIOT protocols such as OPCUA, MQTT, etc.

In general, the traditional Internet of Things (IoT) involves the connection of various consumer devices, such as coffee pots and alarm clocks, to the Internet to allow for various levels of control and automation of those devices. The Industrial Internet of Things (IIoT), on the other hand, involves connecting industrial assets as opposed to consumer devices. There are technical challenges involved in interconnecting diverse industrial assets, such as industrial process control and manufacturing control systems, devices, and components that simply do not exist in the realm of consumer devices.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved industrial control and safety methods and systems, and in particular, for communication with and among programmable controllers and devices for operating and monitoring processes and equipment.

It is another aspect of the disclosed embodiments to provide for IIOT capable communications interface components and modules.

It is yet another aspect of the disclosed embodiments to provide for IIOT capable communications interface components and modules with support for pluggable hardware interfaces and downloadable protocol applications to connect devices in industrial process control and manufacturing control systems.

The aforementioned aspects and other objectives and advantages can now be achieved as described herein. Communications interface systems and methods for industrial process and manufacturing control are disclosed. In an example embodiment, a first infrastructure supports a group of downloadable server protocol applications and a group of downloadable client protocol applications. A second infrastructure can be configured, which supports a group of pluggable hardware interfaces that connect to an underlying communications network. Additionally, a common infrastructure can be configured, which includes a manager and data aggregation layer that connects to and communicates with downloadable server protocol applications and the downloadable client protocol applications. The common infrastructure manages and aggregates data between the first infrastructure and the second infrastructure and creates new interface features by plugging in new and/or available components in multiple form factors.

In some example embodiments, a process controller can be implemented, which communicates with one or more downloadable server protocol applications over a priority channel. In addition, a safety controller can be implemented, which communications with one or more of the downloadable server protocol applications over a safety channel.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. As used herein, the term "and/or" includes any and all combinations of one or more of the associated listed items.

Reference will be made in detail to the disclosed embodiments (exemplary embodiments), examples of which are illustrated in the accompanying drawings, and which may be preferred or alternative embodiments. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected.

Figure 1:
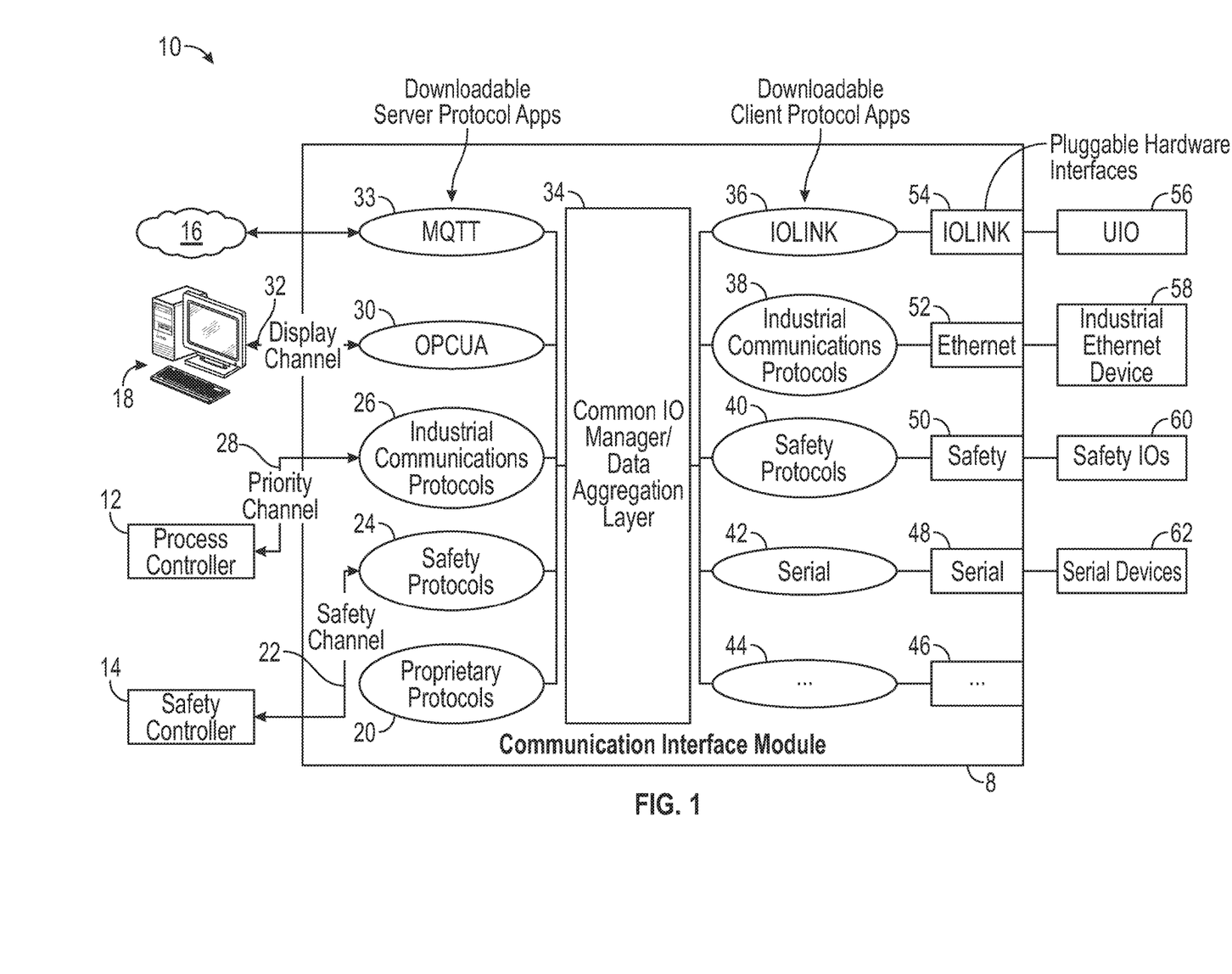
FIG. 1 illustrates a communications interface system for industrial process and manufacturing control, in accordance with an example embodiment.

FIG. 1 illustrates a communications interface system 10 for industrial process and manufacturing control, in accordance with an example embodiment. System 10 provides an IIOT (Industrial Internet of Things) capable communications module or interface 8 that provides support for one or more pluggable hardware interfaces such as the hardware interfaces 46, 48, 40, 52, and 54 and the downloadable applications 20, 24, 26, 30, 33, 36, 38, 40, 42, and 44 to connect devices in industrial process control and manufacturing control systems.

In general, the system 10 includes a communications interface 8 (e.g., a communications interface module) composed of a first infrastructure that supports a group of downloadable server protocol applications 20, 24, 26, 30, and 33 and a group of downloadable client protocol applications 36, 38, 40, 42, and 44. The server protocol application 33 is, for example, an MQTT application and the server protocol application 30 is an OPCUA (OPC Unified Architecture) application. The server protocol application 26 can be implemented as, for example, an industrial communications protocol (e.g., a PROFINET application, an EtherNet/IP application or another type of industrial communications protocol such as, for example, MODBUS, TCP and so on), and the server protocol application 24 can be an application based on one or more safety protocols. In addition, the server protocol application 20 constitutes or facilitates one or more proprietary protocols. Note that the downloadable server and downloadable client applications shown in FIG. 1 may or may not be bound to an Ethernet.

Note that MQTT refers to MQ Telemetry Transport or Message Queue Telemetry Transport. MQTT is an ISO standard (ISO/IEC PRF 20922) describing a messaging protocol for use on top of the TCP/IP protocol. MQTT can be used for connections with remote locations where a "small code footprint" may be required or where the network bandwidth is limited. OPCUA is a machine-to-machine communications protocol for industrial automation developed by the OPC Foundation. Note that terms such as MODBUS, EtherNet/IP, and PROFINET are examples of industrial communications protocols or industrial communications applications governed by standards bodies. MQTT, COAP, and OPCUA are examples of IIOT protocols.

A second infrastructure supports a group of pluggable hardware interfaces 46, 48, 50, 52, and 54 that connect with an underlying communications network based on communications device such as, for example, a serial device 62, a safety IO 60, an industrial Ethernet device 58, or a UIO device 56. For example, the pluggable hardware interface 48 may be a serial interface. Such a serial interface 48 can connect to a serial device 62. The pluggable hardware interface can be a safety interface 50 that connects with the safety IO 60. In some example embodiments, the pluggable hardware interface may be an Ethernet interface 52 that connects with the industrial Ethernet device 58. The pluggable hardware interface may be an IOLINK hardware interface 54 that connects with the Universal IO module device 56. Note that IOLINK or IO-LINK refers to a type of point-to-point serial communication protocol used to communicate with sensors and/or other devices such as, for example, actuators.

Additionally, the system 10 includes a common infrastructure composed of a manager and data aggregation layer 34 that connects to and communicates with the aforementioned group of downloadable server protocol applications 20, 24, 26, 30, and 33 and the group of downloadable client protocol applications 36, 38, 40, 42, and 44. The common infrastructure offered by the manager and data aggregation layer 34 manages and aggregates data between the first infrastructure and the second infrastructure and creates new interface features by plugging in new and/or available components in multiple form factors.

The system 10 further includes a process controller 12 and a safety controller 14. The process controller 12 communicates with the industrial communications application 26 over a priority channel 28. The safety controller 14 communicates with the safety protocols application 24 over a safety channel 22. Additionally, the OPCUA downloadable server protocol application 30 communicates not only with the common manager and data aggregation layer 34, but also communicates with an HMI (Human Machine Interface) 18 over a display channel 32. The HMI 18 is a user interface in a manufacturing or process control system. HMI 18 provides a graphics-based visualization of an industrial control and monitoring system. Previously called an "MMI" (man machine interface), an HMI typically resides in an office-based Windows computer that communicates with a specialized computer in the plant such as a programmable automation controller (PAC), programmable logic controller (PLC), or distributed control system (DCS). The MQTT downloadable server protocol application 33 communicates with the common manager data and aggregation layer 34 and a data communications network 16. The data communications network 16 can also be referred to generally by the term "cloud" or may function as a "cloud based network."

In general, the downloadable server protocol applications 20, 24, 26, 30, and 33 allow connectivity to one or more safety controller(s) 14, one or more process controller(s) 12, the HMI 18, and/or the network 16 using such downloadable applications or "apps". The downloadable client protocol applications or "apps" 36, 38, 40, 42, and 44 allow for connectivity to various devices using different communication protocols. The pluggable hardware interfaces 46, 48, 50, 52, and 54 allow for "plugging" in support for different communication media such as serial, Ethernet, IOLINK, safety, etc.

The display channel 32 allows for low priority data access intended for the HIM 18, and the process channel or priority channel 28 allows for a higher priority data access (than display channel data access) intended to be used for process data exchange with programmable process controllers. The safety channel 22 allows for the highest priority data access (than Display and Process channels) intended to be used to for safety data exchange with safety IO and safety controllers. The common IO manager/data aggregation layer 34 allows for aggregation/normalization of data from devices connected using the pluggable hardware interfaces.

Note that in various example embodiments, one or more portions of the network 16 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WIFI network, another type of network, or a combination of two or more such networks. For example, the network 16 or a portion of the network 16 may include a wireless or cellular network based on a Code Division Multiple Access (CDMA) connection, a Global System for Mobile communications (GSM) connection, or another type of cellular or wireless coupling. In this example, network 16 may implement any of a variety of types of data transfer technology, such as Single Carrier Radio Transmission Technology (1.times.RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

Instructions may be transmitted or received over the network 16 using a transmission medium via a network interface device (e.g., a network interface component included in the communication components 964) and utilizing any one of a number of well-known transfer protocols (e.g., hypertext transfer protocol (HTTP)). Similarly, instructions may be transmitted or received using a transmission medium via a coupling 9 (e.g., a peer-to-peer coupling) to the MQTT protocol application 33. The term "transmission medium" shall be taken to include any intangible medium that is capable of storing, encoding, or carrying instructions for execution by a machine such as system 10 or interface module 8, and includes digital or analog communications signals or other intangible media to facilitate communication of such software.

Note that certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or in any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The system 10 allows for the creation of a communication interface component or module having an Infrastructure for downloadable protocol applications or "apps" and an infrastructure for pluggable hardware interfaces to connect to underlying networks based on, for example, Ethernet, IOLINK, Serial, etc. This allows for a common infrastructure for creating new modules created by plugging in new/available hardware and software components. This approach is thus an IIOT enabler and allows for a common infrastructure for creating modules in multiple form factors.

System 10 thus offers the ability to integrate a variety of devices coming from different vendors without requiring any new development. System 10 is different from the traditional approach of creating an interface module which can do 1-1 translation between some protocols and media. The disclosed embodiments are thus fully customizable by using downloadable protocol apps and pluggable hardware interfaces. In addition, system 10 allows for different media to be supported by plugging in different hardware interfaces, and different proprietary and open protocols are supported by downloading the necessary client and server protocol applications.

System 10 also offers enhanced usability as a customer would be able to use the devices in their configuration without caring for the differences in the nature of the communication media and protocols. In addition, replacement of an old device with a different device can be supported by simply replacing the communication module with a different protocol application and/or plugging in a different hardware interface. The disclosed embodiments also offer increased capacity in the process controllers by separating out communications load from the control applications. The disclosed embodiments further provide for different priority communication channels to distinguish and prioritize safety critical data over process data which is prioritized over display/HMI data. This feature facilitates faster communications in the underlying system and network, which in turn also contributes to faster processing times within the system. In addition, the disclosed approach for independent development and release cycles for apps and hardware interfaces, which allows for a faster time to marker for protocol adoption and allows for a consistence experience for engineering and operations.

Figure 2:
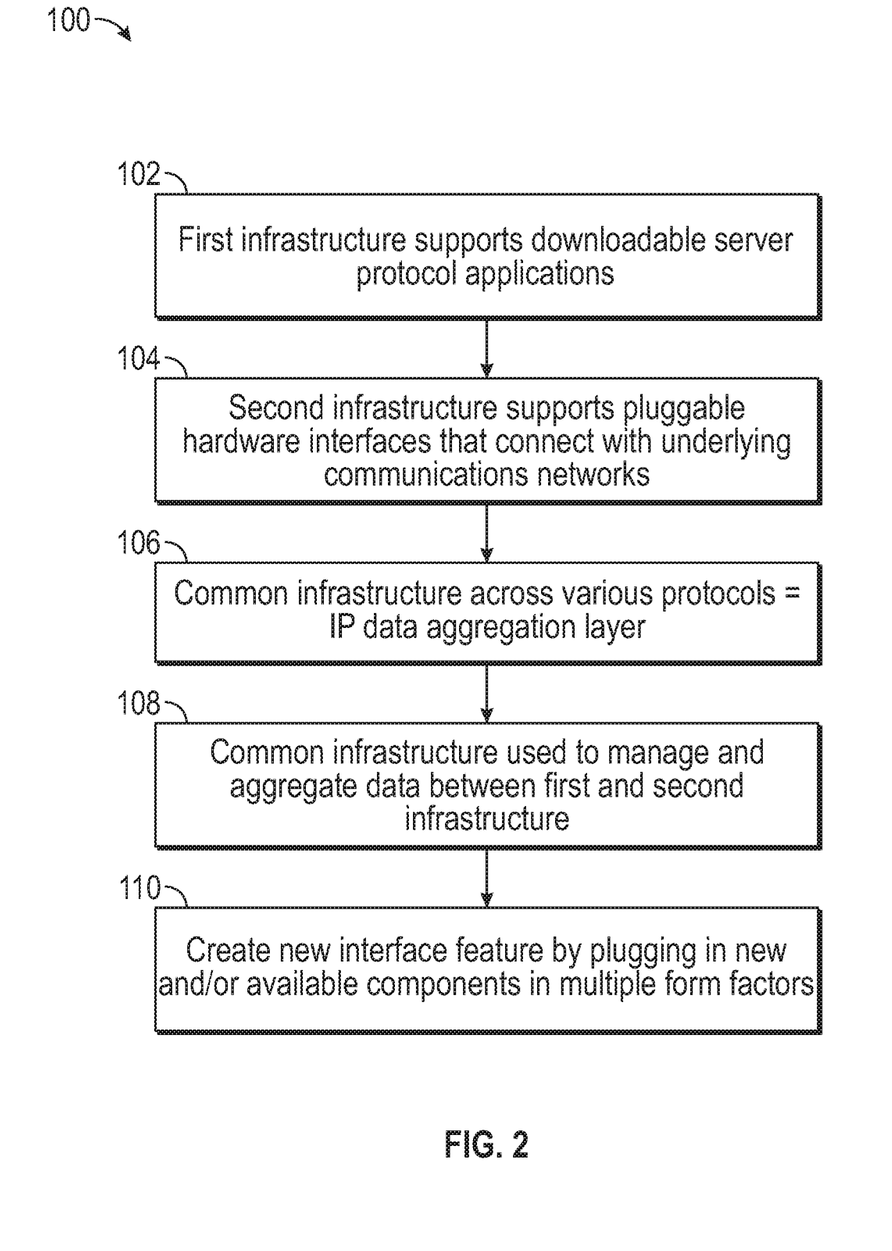
FIG. 2 illustrates a flow chart of operations illustrating logical operational steps of a method for implementing and providing a communications interface system for industrial process and manufacturing control, such as depicted in FIG. 1, in accordance with an example embodiment.

FIG. 2 illustrates a flow chart of operations illustrating logical operational steps of a method 100 for implementing and providing a communications interface system for industrial process and manufacturing control, such as depicted in FIG. 1, in accordance with an example embodiment. FIG. 2 thus depicts steps, operations or instructions for a communications interface method 100 for industrial process and manufacturing control.

As depicted at block 102, a step or operation can be implemented for providing a plurality of downloadable server protocol applications and a plurality of downloadable client protocol applications supported by a first infrastructure. As indicated next at block 104, a step operation can be provided for supporting with a second infrastructure a plurality of pluggable hardware interfaces that connect with underlying communications networks. Thereafter, as shown at block 106, a step or operation can be implemented for providing a common infrastructure comprising a manager and data aggregation layer that connects to and communicates with the plurality of downloadable server protocol applications and the plurality of downloadable client protocol applications. Then, as shown at block 108, a step or operation can be implemented for managing and aggregating data, via the aforementioned common infrastructure, between the first infrastructure and the second infrastructure. Finally, as shown at block 110, a step or operation can be implemented for creating new interface features by plugging in new and/or available components in multiple form factors.

Figure 3:
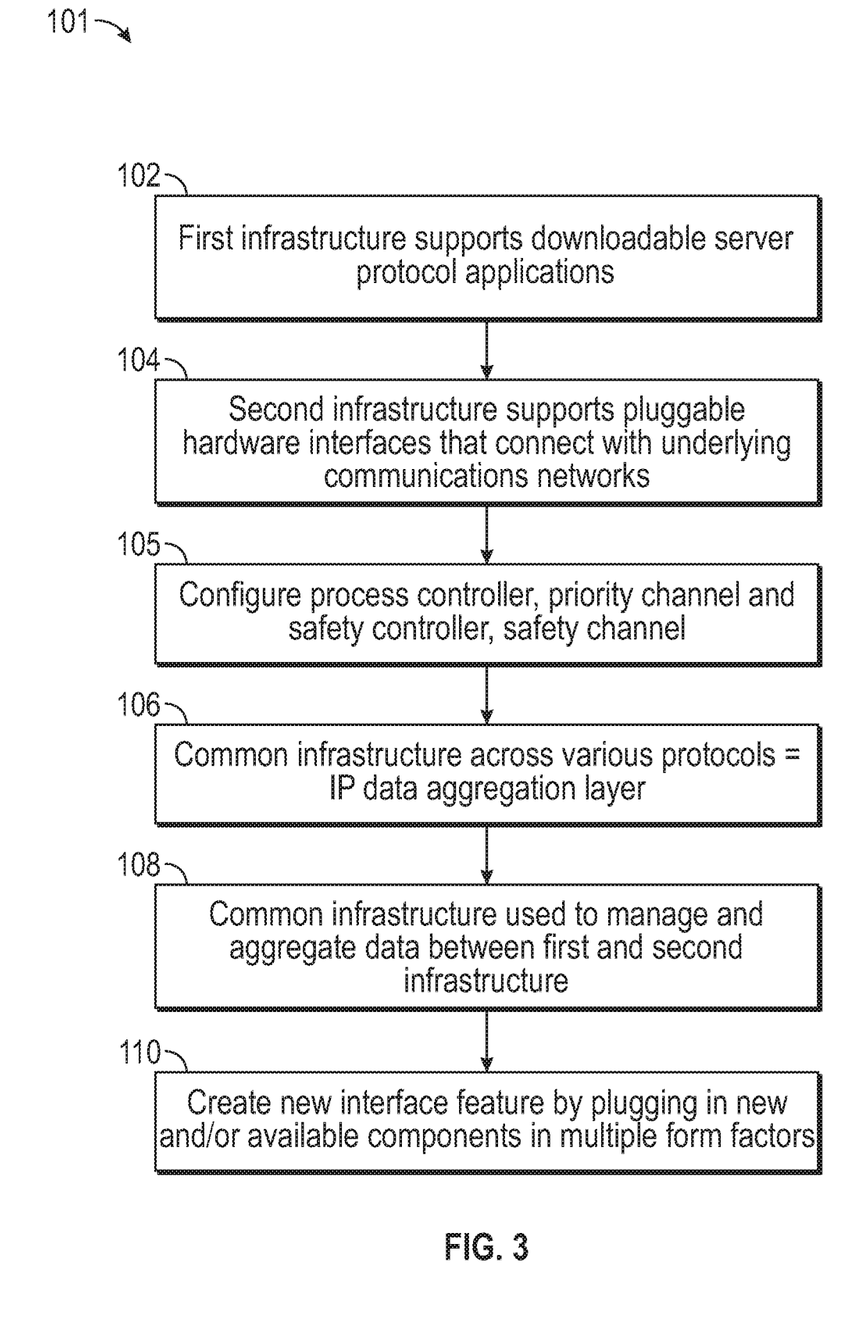
FIG. 3 illustrates a flow chart of operations illustrating logical operational steps of a method for implementing and providing a communications interface system for industrial process and manufacturing control, such as depicted in FIG. 1, in accordance with another example embodiment.

FIG. 3 illustrates a flow chart of operations illustrating logical operational steps of a method 101 for implementing and providing a communications interface system for industrial process and manufacturing control, such as depicted in FIG. 1, in accordance with another example embodiment. Note that in FIGS. 2-3, identical or similar parts are generally indicated by identical reference numerals. Thus method 101 of FIG. 3 is similar to the method 100 shown in FIG. 2, albeit with some minor additions.

The method 101 shown in FIG. 3 includes the additional step or operation shown at block 105, wherein a process controller can be provided, which communicates with at least one downloadable server protocol application among the plurality of downloadable server protocol applications over a priority channel. In addition, a safety controller can be implemented that communicates with at least one downloadable server protocol application among the plurality of downloadable server protocol applications over a safety channel.

As can be appreciated by one skilled in the art, example embodiments can be implemented in the context of a method, data processing system, or computer program product. Accordingly, embodiments may take the form of an entirely hardware embodiment, an entirely software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The disclosed example embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a high speed printing system may be considered a special-purpose computer designed with the specific purpose of rendering or printing documents.

The aforementioned computer program instructions may also be stored in a computer-readable memory (e.g., such as memory 342 shown in FIG. 4) that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
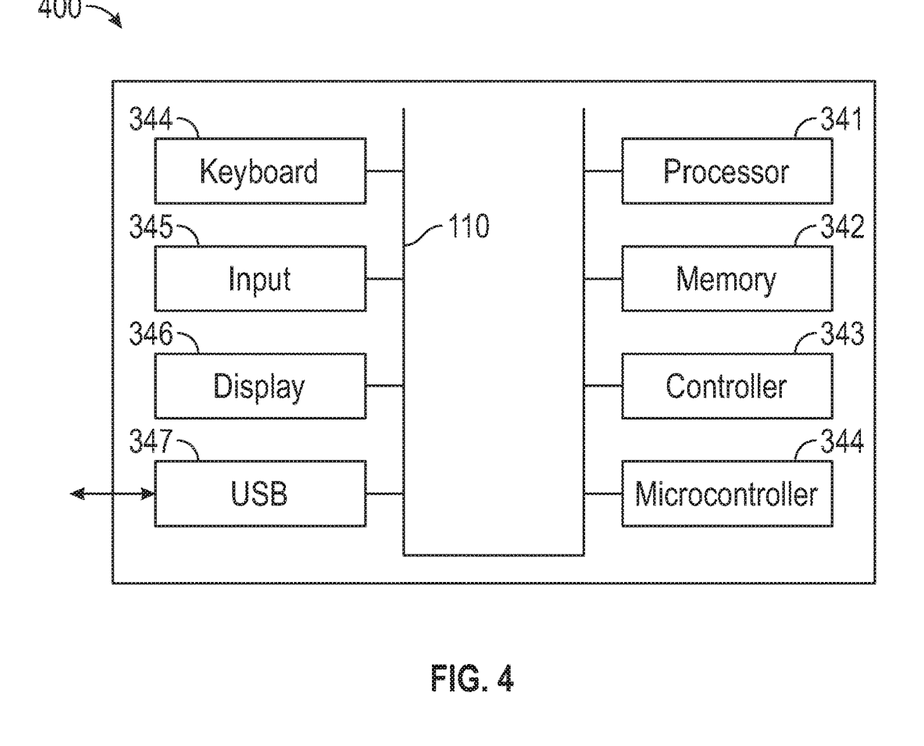
FIG. 4 illustrates a schematic view of a computer system, in accordance with an example embodiment.
Figure 5:
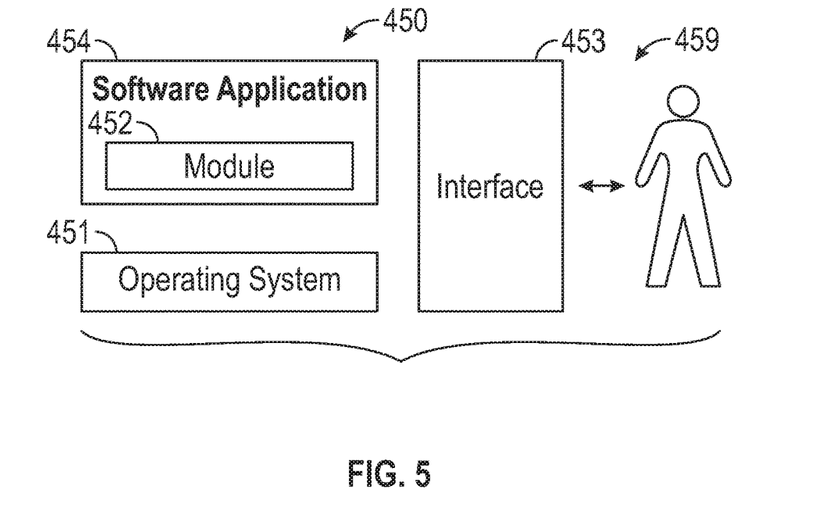
FIG. 5 illustrates a schematic view of a software system including a module, an operating system, and a user interface, in accordance with an example embodiment.

FIGS. 4-5 are shown only as exemplary diagrams of data-processing environments in which example embodiments may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, some embodiments may be implemented in the context of a data-processing system 400 that can include, for example, one or more processors such as a processor 341 (e.g., a CPU (Central Processing Unit) and/or other microprocessors), a memory 342, an input/output controller 343, a microcontroller 332, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components. Note that in some example embodiments, the USB connection 347 may couple or connect electronically with other peripheral computing devices and components.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc).

FIG. 5 illustrates a computer software system 450 for directing the operation of the data-processing system 400 depicted in FIG. 4. Software application 454, stored for example in memory 342 or another memory such as memory 104 shown in FIG. 3, generally includes one or more modules such as module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions or operations such as those discussed herein with respect to FIGS. 1-3. Note that the module 452 may also be composed of a group of modules.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware). Examples of features that can be implemented in some example embodiments as a module or the context of a group of modules are the process controller 12 and the safety controller 14. In addition, the downloadable server protocol applications (or "apps") and the downloadable client protocol apps discussed herein can also be implemented as or in the context of a module or a group of modules. The communications interface module 8 discussed herein is an example of a module.

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. In some example embodiments, the term "module" can also refer to a modular hardware component or a component that is a combination of hardware and software.

FIGS. 4-5 are thus intended as examples and not as architectural limitations of the disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of example embodiments are disclosed herein. In one example embodiment, a communications interface system for industrial process and manufacturing control can be implemented. Such a system can be configured to include, for example, a first infrastructure that supports a plurality of downloadable server protocol applications and a plurality of downloadable client protocol applications; a second infrastructure that supports a plurality of pluggable hardware interfaces that connect with underlying communications networks; and a common infrastructure comprising a manager and data aggregation layer that connects to and communicates with the plurality of downloadable server protocol applications and the plurality of downloadable client protocol applications, wherein the common infrastructure manages and aggregates data between the first infrastructure and the second infrastructure and creates new interface features by plugging in new and/or available components in multiple form factors.

In some example embodiments, a process controller can be provided, which communicates with at least one downloadable server protocol application among the plurality of downloadable server protocol applications over a priority channel. In yet another example embodiment, a safety controller can be provided, which communicates with at least one downloadable server protocol application among the plurality of downloadable server protocol applications over a safety channel.

In still another example embodiment, a communications interface method for industrial process and manufacturing control can be implemented. Such a method can include steps or instructions such as, for example, providing a first infrastructure that supports a plurality of downloadable server protocol applications and a plurality of downloadable client protocol applications; providing a second infrastructure that supports a plurality of pluggable hardware interfaces that connect with underlying communications networks; providing a common infrastructure comprising a manager and data aggregation layer that connects to and communicates with the plurality of downloadable server protocol applications and the plurality of downloadable client protocol applications; managing and aggregating data, via the common infrastructure, between the first infrastructure and the second infrastructure; and creating new interface features by plugging in new and/or available components in multiple form factors.

The preceding description of the disclosed embodiments is provided to enable any person skilled in the art to make or use such embodiments. Various modifications to these embodiments will be readily apparent to those skilled in the art, and the generic principles defined herein may be applied to other embodiments without departing from the spirit or scope of the invention. Thus, the disclosed embodiments are not intended to be limited to the embodiments shown herein, but are to be accorded the widest scope consistent with the following claims and the principles and novel features disclosed herein.

The invention claimed is:

1. A communications interface system for industrial process and manufacturing control, said system comprising:
   a first infrastructure that supports a plurality of downloadable server protocol applications and a plurality of downloadable client protocol applications;
   a second infrastructure that supports a plurality of pluggable hardware interfaces that connect with underlying communications networks; and
   a common infrastructure comprising a manager and data aggregation layer that connects to and communicates with the plurality of downloadable server protocol applications and the plurality of downloadable client protocol applications, wherein the common infrastructure manages and aggregates data between the first infrastructure and the second infrastructure and creates new interface features by plugging in new and/or available components in multiple form factors; and
   a process controller that provides different priority communication channels to distinguish and prioritize safety critical data over process data between the first infrastructure and the second infrastructure which is prioritized over at least one of: display data or HMI (Human Machine Interface) data.

2. The system of claim 1 further comprising a process controller that communicates with at least one downloadable server protocol application among the plurality of downloadable server protocol applications over a priority channel.

3. The system of claim 1 further comprising a safety controller that communicates with at least one downloadable server protocol application among the plurality of downloadable server protocol applications over a safety channel.

4. The system of claim 1 further comprising:
   a process controller that communicates with at least one downloadable server protocol application among the plurality of downloadable server protocol applications over a priority channel; and
   a safety controller that communicates with at least one downloadable server protocol applications over a safety channel.

5. The system of claim 2 wherein said at least one downloadable server protocol application comprises an industrial communications downloadable server application.

6. A communications interface method for industrial process and manufacturing control, said method comprising:

supporting a plurality of downloadable server protocol applications and a plurality of downloadable client protocol applications with a first infrastructure;
supporting with a second infrastructure a plurality of pluggable hardware interfaces that connect with underlying communications networks;
providing a common infrastructure comprising a manager and data aggregation layer that connects to and communicates with the plurality of downloadable server protocol applications and the plurality of downloadable client protocol applications;
managing and aggregating data, via the common infrastructure, between the first infrastructure and the second infrastructure; and
creating new interface features by plugging in new and/or available components in multiple form factors; and
providing different priority communication channels to distinguish and prioritize safety critical data over process data between the first infrastructure and the second infrastructure which is prioritized over at least one of: display data or HMI (Human Machine Interface) data.

7. The method of claim 6 further comprising providing a process controller that communicates with at least one downloadable server protocol application among the plurality of downloadable server protocol applications over a priority channel.

8. The method of claim 6 further comprising providing a safety controller that communicates with at least one downloadable server protocol application among the plurality of downloadable server protocol applications over a safety channel.

9. The method of claim 6 further comprising:
   providing a process controller that communicates with at least one downloadable server protocol application among the plurality of downloadable server protocol applications over a priority channel; and
   providing a safety controller that communicates with at least one downloadable server protocol application among the plurality of downloadable server protocol applications over a safety channel.

10. The method of claim 7 wherein said at least one downloadable server protocol application comprises an industrial communications EtherNet/IP downloadable server application.

11. A communications interface system for industrial process and manufacturing control, said system comprising:
    at least one processor; and
    a non-transitory computer-usable medium embodying computer program code, said computer-usable medium capable of communicating with said at least one processor, said computer program code comprising instructions executable by said at least one processor and configured for:
    supporting a plurality of downloadable server protocol applications and a plurality of downloadable client protocol applications with a first infrastructure;
    supporting with a second infrastructure a plurality of pluggable hardware interfaces that connect with underlying communications networks;
    providing a common infrastructure comprising a manager and data aggregation layer that connects to and communicates with the plurality of downloadable server protocol applications and the plurality of downloadable client protocol applications;
    managing and aggregating data, via the common infrastructure, between the first infrastructure and the second infrastructure; and creating new interface features by plugging in new and/or available components in multiple form factors; and providing different priority communication channels to distinguish and prioritize safety critical data over process data between the first infrastructure and the second infrastructure which is prioritized over at least one of: display data or HMI data.

12. The system of claim 11 wherein said instructions are further configured for providing a process controller that communicates with at least one downloadable server protocol application among the plurality of downloadable server protocol applications over a priority channel.

13. The system of claim 11 wherein said instructions are further configured for providing a safety controller that communicates with at least one downloadable server protocol application among the plurality of downloadable server protocol applications over a safety channel.

14. The system of claim 11 wherein said instructions are further configured for:

providing a process controller that communicates with at least one downloadable server protocol application among the plurality of downloadable server protocol applications over a priority channel; and providing a safety controller that communicates with at least one downloadable server protocol application among the plurality of downloadable server protocol applications over a safety channel.

15. The system of claim 12 wherein said at least one downloadable server protocol application comprises an industrial communications downloadable server application.

16. The system of claim 13 wherein said safety channel is configured to allow for a highest priority data access for safety data exchange with at least one I/O and safety controller.

17. The system of claim 16 wherein said manager and data aggregation layer is configured to allow for aggregation/normalization of data from at least one device connected using a pluggable hardware interface.

* * * * *